United States Patent
Araki et al.

(10) Patent No.: US 12,503,549 B2
(45) Date of Patent: Dec. 23, 2025

(54) BIAXIALLY-STRETCHED POLYESTER RESIN FILM AND MANUFACTURING METHOD FOR SAME

(71) Applicants: UNITIKA LTD., Osaka (JP); NIPPON ESTER CO., LTD., Okazaki (JP); UNITIKA TRADING CO., LTD., Osaka (JP)

(72) Inventors: Goro Araki, Uji (JP); Hiroshi Ashihara, Uji (JP); Hazumu Nagano, Uji (JP)

(73) Assignee: UNITIKA LTD., Osaka (JP)

( * ) Notice: Subject to any disclaimer, the term of this patent is extended or adjusted under 35 U.S.C. 154(b) by 517 days.

(21) Appl. No.: 17/915,219

(22) PCT Filed: Mar. 26, 2021

(86) PCT No.: PCT/JP2021/013129
§ 371 (c)(1),
(2) Date: Sep. 28, 2022

(87) PCT Pub. No.: WO2021/200754
PCT Pub. Date: Oct. 7, 2021

(65) Prior Publication Data
US 2023/0113079 A1    Apr. 13, 2023

(30) Foreign Application Priority Data

Mar. 31, 2020 (JP) .................................. 2020-063466
Sep. 30, 2020 (JP) .................................. 2020-165553

(51) Int. Cl.
*C08G 63/183* (2006.01)

(52) U.S. Cl.
CPC .................................. *C08G 63/183* (2013.01)

(58) Field of Classification Search
CPC ............... B29C 55/12; C08G 18/0823; C08G 18/0852; C08G 18/0866; C08G 18/12; C08G 18/242; C08G 18/244; C08G 18/246; C08G 18/302; C08G 18/348; C08G 18/42; C08G 18/44; C08G 18/48; C08G 18/61; C08G 18/6625; C08G 18/69; C08G 18/73; C08G 18/751; C08G 18/757; C08G 18/7614; C08G 18/7621; C08G 18/7671; C08G 18/7678; C08G 18/7685; C08G 63/183; C08G 63/78; C08G 63/672; C08J 2300/30; C08J 2467/02; C08J 5/18; C08J 2367/00; C08K 3/36; C08L 2205/025; C08L 2205/03; C08L 67/02; C08L 2207/20; C09D 175/04; C09D 7/20; Y02W 30/62

See application file for complete search history.

(56) References Cited

U.S. PATENT DOCUMENTS

| 4,609,680 A | 9/1986 | Fujita et al. |
| 2010/0167016 A1 | 7/2010 | Manabe et al. |

FOREIGN PATENT DOCUMENTS

| JP | S42-8855 Y1 | 5/1967 |
| JP | S48-62732 A | 9/1973 |
| JP | S60-248646 A | 12/1985 |
| JP | H10-310637 A | 11/1998 |
| JP | 2005-171138 A | 6/2005 |
| JP | 2011-68756 A | 4/2011 |
| JP | 2011-190387 A | 9/2011 |
| JP | 2012-41463 A | 3/2012 |
| JP | 2012-126763 A | 7/2012 |
| WO | 2007/094382 A1 | 8/2007 |

OTHER PUBLICATIONS

Yamamoto et al JP 2005219212 A (Year: 2005).*
Imai JP 2006341424 A (Year: 2006).*

* cited by examiner

*Primary Examiner* — Lawrence D Ferguson
(74) *Attorney, Agent, or Firm* — Troutman Pepper Locke LLP; James E. Armstrong, IV; Nicholas J. DiCeglie, Jr.

(57) ABSTRACT

To provide a biaxially stretched polyester resin film that has excellent properties equal to or better than those of biaxially stretched polyester film that does not use recycled raw material, and in particular that has an excellent flexural resistance in low-temperature environments. A biaxially stretched polyester resin film that characteristically satisfies both of the following properties (1) and (2): (1) in differential scanning calorimetry (DSC), after heating from 25° C. to 300° C. at a heating rate of 20° C./minute and holding for 10 minutes at 300° C., the temperature of crystallization during cooling at a cooling rate of 40° C./minute is 160° C. to 180° C.; and (2) the number of pinholes after the execution of 200 repetitive cycles of a flexural fatigue test in a −10° C. atmosphere using a Gelbo Flex Tester is not more than 10/500 cm².

5 Claims, No Drawings

BIAXIALLY-STRETCHED POLYESTER RESIN FILM AND MANUFACTURING METHOD FOR SAME

TECHNICAL FIELD

The present invention relates to a novel biaxially stretched polyester resin-based film and to a method for producing same.

BACKGROUND ART

Polyethylene terephthalate (PET), which is a typical example of the polyester resins, has a high melting point, exhibits chemical resistance, and has a relatively low cost, and as a consequence is widely used in, for example, molded articles such as fibers, films, and PET bottles. The generation of waste cannot be avoided with these polyester products during the production stage or processing stage, and these products are also frequently discarded after use. This creates the need to dispose of large amounts of these polyester wastes and post-use polyester products. However, when their disposal is pursued through incineration in an incinerator, large amounts of heat are generated, resulting in substantial damage to the incinerator and a shortening of incinerator life; in addition, problems also arise with regard to atmospheric pollution, the generation of $CO_2$ gas, and so forth.

These problems can be avoided when, in response, disposal without incineration is carried out; however, polyester resins remain in the natural environment on a semi-permanent basis because they do not degrade and decompose in the natural environment. As a consequence, among the single-use polyester products, for example, polyester containers discarded as trash flow into the ocean via rivers and are finely pulverized into microplastics by the action of, e.g., waves, tidal currents, and ultraviolet radiation. The problem has also been recognized in recent years that these microplastics accumulate in marine organisms and concentrate in the food chain and exercise adverse effects on marine organism ecosystems and are a major cause of marine pollution by plastics. For these reasons, efforts are underway worldwide, inter alia, to reduce the consumption of plastics, including polyester resins, and to switch to biodegradable plastics.

For the same reasons, recycling, which involves resource re-utilization, is being carried out using a variety of methods. The following have also been considered for polyester products, as represented by PET: methods for recycling the polyester waste generated during the corresponding production processes, and methods in which products, which have been discarded post-market, are recovered and re-used as a raw material. In particular, products provided with an Eco mark, which certifies that a certain recycle ratio has been achieved, have been becoming more widespread in recent years.

There have also been a variety of proposals with regard to recycling methods that use, as a raw material, recycled polyester provided by the recovery of polyester waste produced during a manufacturing process or the recovery of post-consumer polyester products.

For example, the following have been proposed: a method in which methanol is added to waste PET and decomposition is carried out into dimethylene terephthalate (abbreviated in the following as "DMT") and ethylene glycol (abbreviated in the following as "EG") (PTL 1); a method in which EG is added to waste PET and depolymerization is carried out, followed by the addition of methanol and the recovery of DMT (PTL 2); and a method in which waste PET is depolymerized with EG to provide oligomer and this is used in a polycondensation reaction (PTL 3) or is used after depolymerization in a solid-phase polymerization (PTL 4, PTL 5).

Impurities that can be problematic during the recycling of, e.g., post-consumer PET bottles, include the various additives that are added to polyester resins, and also include material attached to the bottle body, i.e., a) caps (aluminum, polypropylene, polyethylene), b) inner plugs, c) liners (polypropylene, polyethylene), d) labels (paper, resins such as polystyrene, ink), e) adhesives, f) printing inks, and so forth.

The pretreatment in a recycling process is generally carried out using a procedure such as the following. The recovered PET bottle is first passed across a vibrating screen in order to remove sand, metal, and so forth. The PET bottle is then washed and colored bottles are separated and a coarse pulverization is subsequently carried out. Labels and so forth are removed by wind force separation. Aluminum fragments originating with, e.g., caps, are removed and the PET bottle fragments are finely pulverized. Components such as adhesives, protein, mold, and so forth are removed using a high-temperature alkali wash, and a step is performed in which dissimilar components, e.g., polypropylene, polyethylene, and so forth, are separated using specific gravity differences.

CITATION LIST

Patent Literature

[PTL 1] Japanese Examined Patent Publication No. S42-8855
[PTL 2] Japanese Patent Application Publication No. S48-62732
[PTL 3] Japanese Patent Application Publication No. S60-248646
[PTL 4] Japanese Patent Application Publication No. 2012-126763
[PTL 5] Japanese Patent Application Publication No. 2012-041463

SUMMARY OF INVENTION

Technical Problem

However, there are problems with this prior art with regard to the process for producing films from the obtained polyester resin, and in addition there is also room for additional improvements with regard to the properties of the obtained polyester resin film.

For example, with the methods described in PTL 1 to PTL 3, the installation, operation, and maintenance of the recovery equipment is very costly and there is room for improvement with regard to practicality.

With regard to the recycled polyester resins yielded by the recycling methods described in PTL 1 to PTL 3, removal of the foreign material deriving from non-polyester resins is inadequate and the amount of foreign material admixture cannot be adequately reduced. Due to this, contamination of the T-die surface (lip surface) occurs during the film production step, and the problem of film breakage occurs frequently during the stretching step. As a result, the process operability becomes very poor and continuous operation on a long-term basis is problematic. When, in particular, the production of thin film is to be carried out, a fast take-up speed must be used during film production, and thus greater tension is applied than with thick film, and the aforementioned problems become even more significant as a consequence.

Films provided by film production from the recycled polyester resins yielded by the methods described in PTL 4 and PTL 5 do not exhibit satisfactory mechanical strength, beginning with tensile elongation, and as a consequence breakage also readily occurs in the stretching step during thin film production, the operability is also problematic, and the flexural resistance at low temperatures is poor.

In this regard, it is generally possible to obtain films having better properties when the percentage content of virgin polyester in the film raw material is increased, but this is unable to provide improvement with regard to the flexural resistance at low temperatures. On the other hand, it is desirable from an environmental perspective to be able to increase the percentage of recycled raw material in a film. For example, a recycled raw material percentage of at least 25 mass % is required for the Eco mark certification of the laminated packaging material provided by bonding a polyester film with a film composed of another material. However, within the sphere of thin polyester films having a thickness of not more than 50 μm, it is difficult to produce stretched film having a high recycle percentage of 35% or more.

Thus, from the perspective of reducing plastic consumption, a method is required that can produce a biaxially stretched polyester resin film, even thin films having a thickness of 50 μm or less, that has excellent properties equal to or better than those of biaxially stretched polyester film that does not use recycled raw material, wherein this method is capable of long-term continuous operation. However, the development of such a method has in fact not been achieved at the present time.

Accordingly, a principal object of the present invention is to provide a biaxially stretched polyester resin film that has excellent properties equal to or better than those of biaxially stretched polyester film that does not use recycled raw material, and in particular that has an excellent flexural resistance in low-temperature environments. Another object of the present invention is to provide a production method that, even using a recycled polyester raw material, enables long-term continuous operation even in the case of thin film having a thickness less than or equal to 50 μm.

Solution to Problem

As a result of extensive and intensive investigations considering the problems with the prior art, the present inventors discovered that the aforementioned objects could be achieved by a polyester resin film obtained via prescribed steps using a recycled polyester raw material provided by the recovery of post-use polyester products or the recovery of polyester scrap generated during the process of producing polyester products. The present invention was accomplished based on this discovery.

That is, the present invention relates to the following biaxially stretched polyester resin film and the following method for producing this biaxially stretched polyester resin film.

1. A biaxially stretched polyester resin-based film characterized in that the film satisfies both of the following properties (1) and (2):
    (1) in differential scanning calorimetry (DSC), after heating the film from 25° C. to 300° C. at a heating rate of 20° C./minute and holding for 10 minutes at 300° C., the temperature of crystallization during cooling at a cooling rate of 40° C./minute is 160° C. to 180° C.; and
    (2) the number of pinholes after the execution of 200 repeating cycles of a flexural fatigue test in a −10° C. atmosphere using a Gelbo Flex Tester is not more than 10/500 cm$^2$.
2. The biaxially stretched polyester resin film according to the aforementioned item 1, wherein the haze of the film is not more than 10.0%.
3. The biaxially stretched polyester resin film according to the aforementioned item 1, wherein the concentration of carboxyl end groups is 20 to 60 eq/t.
4. The biaxially stretched polyester resin film according to the aforementioned item 1, wherein the surface crystallinity as determined by infrared spectroscopic analysis (ATR-IR) using a total reflection measurement method is 1.1 to 1.4.
5. The biaxially stretched polyester resin film according to the aforementioned item 1, having a thickness of not more than 50 μm and having a tensile elongation in both the MD direction and TD direction of at least 100%.
6. The biaxially stretched polyester resin film according to claim 1, having a b* value of 0 or less
7. A packaging material including the biaxially stretched polyester resin film according to any one of the aforementioned items 1 to 6.
8. A method for producing a biaxially stretched polyester resin film characterized in the method includes:
    (A) a step of obtaining a reaction product by subjecting a recycled polyester raw material to a depolymerization reaction;
    (B) a step of filtering the reaction product and recovering the filtrate;
    (C) a step of obtaining a polyester resin by subjecting the filtrate to a polycondensation reaction at a temperature of at least 260° C. in the presence of a polymerization catalyst and at a pressure of 1.0 hPa or less; and
    (D) a step of producing an unstretched film using a starting material comprising the polyester resin and subjecting the unstretched film to biaxial stretching.
9. The method for producing a biaxially stretched polyester resin film according to the aforementioned item 8, wherein the step (A) is carried out in the presence of an ethylene terephthalate oligomer and ethylene glycol.
10. The method for producing a biaxially stretched polyester resin film according to the aforementioned item 9, wherein the step (A) is carried out within the range of 1.08 to 1.35 of a molar ratio of the total glycol component/total acid component for all of the components of the ethylene terephthalate oligomer, ethylene glycol and recycled polyester raw material.
11. The method for producing a biaxially stretched polyester resin film according to the aforementioned item 8, wherein filtration in the step (B) is carried out with a filter having a filtration particle size of 10 to 25 μm.

Advantageous Effects of the Invention

The present invention can thus provide a biaxially stretched polyester resin film that has excellent properties equal to or better than those of biaxially stretched polyester film that does not use recycled raw material, and in particular that has an excellent flexural resistance in low-temperature atmosphere.

In particular, the biaxially stretched polyester resin film of the present invention contains polyester resin that has a low content of foreign material and a specific range of a temperature of crystallization during cooling, polyester resin being obtained by processing recycled raw material in specific steps. This enables the execution of long-term continuous production at high stretching rates, and the surface crystallinity of the resulting film is kept low, even if the film has a thicknesses of 50 μm or less. As a result, the biaxially stretched polyester resin film according to the present invention can exhibit a flexural resistance in low-temperature environments that is better than that of polyester resin that does not contain recycled raw material, and can also exhibit a tensile elongation in the MD and TD directions as good as that of polyester resin film that does not include a recycled raw material.

Moreover, the present invention can provide biaxially stretched polyester resin film having a high recycle ratio, i.e., a recycle ratio of at least 35%. This film can also exhibits excellent mechanical properties, i.e., tensile strength and tensile elastic modulus, as well as an excellent transparency, color, wetting behavior, and printability, and as a consequence can be favorably used as packaging material in particular.

The production method according to the present invention can efficiently and reliably produce biaxially stretched polyester resin film that exhibits an excellent flexural resistance and so forth as noted above. That is, biaxially stretched polyester resin film obtained in accordance with the production method according to the present invention can also exhibit the excellent characteristics identified above.

DESCRIPTION OF EMBODIMENTS

1. The Biaxially Stretched Polyester Resin Film

The biaxially stretched polyester resin film according to the present invention (the film according to the present invention) characteristically satisfies both of the following properties (1) and (2):

(1) in differential scanning calorimetry (DSC), after heating from 25° C. to 300° C. at a heating rate of 20° C./minute and holding for 10 minutes at 300° C., the temperature of crystallization during cooling at a cooling rate of 40° C./minute is 160° C. to 180° C.; and (2) the number of pinholes after the execution of 200 repetitive cycles of a flexural fatigue test in a −10° C. atmosphere using a Gelbo Flex Tester is not more than 10/500 cm².

(A) Composition of the Film According to the Present Invention

The film according to the present invention contains polyester resin, and the content thereof is not particularly limited. The polyester resin content in the present invention is preferably about 60 to 100 mass % in the film according to the present invention, with 80 to 100 mass % in particular being more preferred. Other components may thus be incorporated in a range that does not substantially adversely affect the advantages of the present invention.

These other components can be exemplified by the additives that are generally incorporated in known films, as described below. These additives encompass additives that are added for the first time during production of the film according to the present invention, but also encompass, e.g., the additives, impurities or the like that are present in the raw material.

The polyester resin present in the film according to the present invention can be exemplified by polyethylene terephthalate, polybutylene terephthalate and the like. In the present invention, all or a portion of its raw material desirably comprises polyethylene terephthalate (PET) from the standpoint of facilitating the utilization of polyester resin that contains a component originating from a recycled polyester raw material (such a polyester resin is referred to hereafter as "recycled polyester resin"). In this case, the proportion of PET in the polyester resin is not particularly limited, but can ordinarily be established as appropriate in the range from 70 to 100 mass %, preferably from 80 to 100 mass %, and most preferably from 90 to 100 mass %.

PET is generally the polycondensate of ethylene glycol and terephthalic acid, but, depending on the raw material used, a component or components other than these two components may be contained. In this case, the non-PET polyester resin may also be produced by a polycondensation reaction, and such embodiments are also encompassed by the present invention. That is, the film according to the present invention, when it contains a non-PET polyester resin, may contain polyester resin provided by the copolymerization of a component or components as described below as the acid component or glycol component. In addition, when non-PET polyester resin is incorporated, one or two or more kinds of the polyester resin may be included.

The acid component constituting the polyester resin can be exemplified by isophthalic acid, phthalic acid, phthalic anhydride, naphthalenedicarboxylic acid, adipic acid, sebacic acid, 1,4-cyclohexanedicarboxylic acid, dodecanedioic acid, and so forth, dimer acids, and also trimellitic anhydride, trimellitic acid, pyromellitic acid, 1,4-cyclohexanedicarboxylic acid, sebacic acid, dimer acids, and so forth. This may be used individually or in combination.

The glycol component constituting the polyester resin can be exemplified by neopentyl glycol, 1,4-butanediol, 1,2-propylene glycol, 1,5-pentanediol, 1,3-propanediol, 1,6-hexamethylenediol, diethylene glycol, 1,4-cyclohexanedimethanol, dimer diols, butylethylpropanediol, (2-methyl-1,3-propanediol, trimethylolpropane, glycerol, pentaerythritol, and ethylene oxide adducts on bisphenol A or bisphenol S. This can be used individually or in combination.

The concentration of carboxyl end groups in the film according to the present invention is not particularly limited, but about 20 to 60 eq/t is generally preferred. In particular, the upper limit here is preferably not greater than 50 eq/t and most preferably not greater than 45 eq/t. In addition, the lower limit is most preferably greater than or equal to 30 eq/t. When the concentration of carboxyl end groups is not more than 60 eq/t, it possible to obtain a biaxially stretched film that exhibits an excellent heat-resistance performance and an excellent tensile elongation in the MD and TD directions. On the other hand, when the carboxyl end group concentration is at least 20 eq/t, it possible to continuously produce, on a relatively long-term basis and at high stretching ratios, biaxially stretched films that have an excellent tensile elongation in the MD and TD directions, as well as polyester resin films that do not use recycled raw material, even if the biaxially stretched films are thin films having a thickness of 50 μm or less.

Using 100 mol % for the total amount of the total glycol component, the polyester resin film according to the present invention preferably has a diethylene glycol content of 0.5 to 3.0 mol %, more preferably 1.0 to 3.0 mol %, and most preferably 1.2 to 3.0 mol %. In particular, by using the recycled polyester resin described below, the contamination of the T-die surface (lip surface) during film production can be inhibited, as a result, the biaxially stretched film can be obtained at high stretching ratios on a long-term basis from polyester resin having a high recycle ratio.

One or two or more of various additives, for example, colorants, fillers, dispersants, antioxidants, ultraviolet absorbers, preservatives, static inhibitors, blocking inhibitors, inorganic fine particles, and so forth, may be added to the polyester resin film according to the present invention within a range that does not exercise a negative effect on film performance.

In particular, a lubricant may be incorporated in the film according to the present invention for the purpose of increasing a slipperiness of the film. Any inorganic lubricant or organic lubricant can be used as the lubricant. Specific examples of the lubricant include clay, talc, calcium carbonate, zinc carbonate, wollastonite, silica, alumina, magnesium oxide, calcium silicate, sodium aluminate, calcium aluminate, magnesium aluminosilicate, glass balloons, carbon black, zinc oxide, antimony trioxide, zeolite, hydrotalcite, layered silicates, and ethylenebisstearamide. Silica is preferred among the preceding. The lubricant content is not limited, but the range of about 0.01 to 0.3 mass % in the polyester resin film is generally suitable.

On the other hand, from the point of view of improving the transparency, the film according to the present invention has an impact resistance improver content of preferably not more than 3 mass %, more preferably not more than 2 mass %, still more preferably not more than 1 mass %, and particularly preferably not more than 0.5 mass %, and most preferably an impact resistance improver is substantially not contained. An impact resistance improver is a dispersed material (dispersed particles) for inhibiting the growth of cracks brought about by impact or bending applied to the film. Thus, as long as materials can exhibit such a function, the impact resistance improver encompasses materials commercially available under various designations, e.g., "impact resistance improver" and "impact strength modifier", but also materials used or commercially available under other designations.

Materials that have such a function can be exemplified in particular by elastomers and rubbers. Examples at a more specific level are olefin polymers such as (ethylene and/or propylene)·α-olefin copolymers, (ethylene and/or propylene) (α,β-unsaturated carboxylic acid and/or unsaturated carboxylic acid ester) copolymers, and ionomer polymers; elastomers such as styrenic elastomers, urethane elastomers, fluoroelastomers, vinyl chloride elastomers, polyester elastomers, and polyamide elastomers; and synthetic rubbers such as thiokol rubbers, polysulfide rubbers, acrylic rubbers, silicone rubbers, polyether rubbers, and epichlorohydrin rubbers.

When an impact resistance improver is added, the flexural resistance of the film can be improved, but the transparency is reduced due to the dispersion of particles of the impact resistance improver in the film. For that reason, in conventional biaxially stretched polyester resin films, the flexural resistance and transparency conflict with each other, and it is difficult to improve both at the same time. In contrast, the film according to the present invention can exhibit an excellent flexural resistance or the like even without the incorporation of such impact resistance improvers, as a result, a high transparency can also be obtained. That is, the present invention can provide a film having both a high transparency etc. and a high flexural resistance.

A surface treatment, e.g., a corona discharge treatment, adhesion-promoting treatment, and so forth, may be executed on the film according to the present invention in a range in which the effects of the present invention are not impaired. In addition, an adhesion-promoting layer, a barrier coating layer, a printing layer, and so forth may also be provided if necessary.

(B) The Structure and Properties of the Film According to the Present Invention

The film according to the present invention is a biaxially stretched (biaxially oriented) film that satisfies both of the following properties (1) and (2):

(1) in differential scanning calorimetry (DSC), after heating from 25° C. to 300° C. at a heating rate of 20° C./minute and holding for 10 minutes at 300° C., the temperature of crystallization during cooling at a cooling rate of 40° C./minute (the cooling crystallization temperature) is 160° C. to 180° C.; and (2) the number of pinholes after the execution of 200 repetitive cycles of a flexural fatigue test in a −10° C. atmosphere using a Gelbo Flex Tester is not more than 10/500 cm$^2$.

(1) The Crystallization Temperature (Tc) During Cooling

The lower limit for the crystallization temperature during cooling (Tc) of the film according to the present invention must be greater than or equal to 160° C. and is preferably greater than or equal to 163° C., in particular more preferably greater than or equal to 165° C., and most preferably greater than or equal to 170° C.

In addition, the upper limit on Tc must be less than or equal to 180° C. and is preferably less than or equal to 178° C. and in particular is more preferably less than or equal to 175° C. An excellent flexural resistance in low-temperature environments and an excellent tensile elongation can be brought about by controlling the cooling crystallization temperature into the indicated range. The cooling crystallization temperature (Tc) of the film according to the present invention can be brought into the indicated range by having the content of the recycled polyester resin, as described below, in the raw material for the film according to the present invention be preferably at least 30 mass % and more preferably at least 40 mass %.

(2) The Flexural Resistance

The flexural resistance is one of the characteristic features in the present invention that is superior to that of conventional polyester resin films (particularly virgin polyester films). The number of pinholes in the film surface after a prescribed flexural resistance test is used as the index for the magnitude of this flexural resistance, wherein a lower number of pinholes indicates a higher flexural resistance.

In this test, the number of pinholes is measured after the execution of 200 repetitive cycles of a flexural fatigue test in a −10° C. atmosphere using a Gelbo Flex Tester, and is reported as the number of pinholes per not more than 500 cm$^2$ of the film. The Gelbo Flex Tester (device) itself is not particularly limited, and a known device or commercially available device can be used.

The number of pinholes in the film according to the present invention is generally not more than 10/500 cm$^2$ and in particular is desirably not more than 5/500 cm$^2$. That is, a film having such a small number of pinholes exhibits an excellent resistance to bag breakage when used as a package, and can be particularly favorably used for containers for foods in chilled distribution and for food packaging materials, and also for medical containers such as infusion bags.

(3) Other Properties

In addition to the aforementioned properties (1) and (2), the film according to the present invention desirably also has at least one of the properties described in the following.

(3-1) Haze (Hz)

From the standpoint, for example, of being able to maintain transparency when used as, for example, packaging material, the haze is generally not more than 10% and in particular is more preferably not more than 8% and most preferably not more than 7%. The lower limit for the haze can be, for example, about 0.1%, but there is no limitation to this. When there are no requirements on the transparency of the film according to the present invention, the haze may then exceed 10%.

(3-2) Surface Crystallinity

The surface crystallinity of the film according to the present invention is not particularly limited, but is desirably established within the following range. The lower limit is preferably at least 1.1, more preferably at least 1.15, and most preferably at least 1.2. The upper limit is preferably not more than 1.4 and more preferably not more than 1.35. Mechanical strength, and particularly an excellent flexural resistance can be obtained by setting the above range of the surface crystallinity.

(3-3) The b* Value

Based on a consideration of appearance, the b* value of the film according to the present invention is preferably less than or equal to 0 and is more preferably less than or equal to −1. The b* value is an index that indicates color. A higher b* value indicates that the film has a stronger yellow color, and, due to the association with deterioration of the packaging material or contents, lower values of b* are preferred.

(3-4) Wet Tension

From the standpoint of suitability for printing when printing on the surface of the film according to the present invention is carried out, the wetting tension is preferably at least 44 mN/m, more preferably at least 46 mN/m, and most preferably at least 50 mN/m.

(3-5) Tensile Elongation

The tensile elongation of the film according to the present invention in both the MD and TD directions is preferably at least 100%, more preferably at least 110%, still more preferably at least 115%, and most preferably at least 120%. A tensile elongation of less than 100% is unsatisfactory because the film is then brittle and can rupture during stretching, long-term continuous production is problematic, and sheet or bag breakage is also readily occurred when used as a packaging material.

(3-6) Tensile Strength

The tensile strength of the film according to the present invention in both the MD and TD directions is preferably at least 200 MPa, more preferably at least 210 MPa, and most preferably at least 220 MPa.

(3-7) Tensile Elastic Modulus

The tensile elastic modulus of the film according to the present invention in both the MD and TD directions is preferably at least 3.0 GPa, more preferably at least 3.5 GPa, and most preferably at least 3.7 GPa.

(3-8) Puncture Strength

Viewed in terms of inhibiting breakage due to contact with a protrusion or projection in the contents when used as a packaging material, the film according to the present invention has a puncture strength preferably of at least 7.0 N, in particular more preferably of at least 7.5 N, and most preferably of at least 8.0 N.

(3-9) Dry Heat Shrinkage Ratio

From the standpoint of inhibiting heat distortion during processing steps, the film according to the present invention has a dry heat shrinkage ratio in both the MD and TD directions preferably of not more than 2.0%, in particular more preferably of not more than 1.5%, and most preferably of not more than 1.0%.

(3-10) Film Thickness

From the standpoint of reducing plastic consumption, the thickness of the film according to the present invention is preferably not more than 50 μm, in particular more preferably not more than 45 μm, and most preferably not more than 40 μm. Viewed in terms of preserving the mechanical strength, the lower limit is more preferably greater than or equal to 5 μm and in particular is most preferably greater than or equal to 10 μm.

2. The Method for Producing Biaxially Stretched Polyester Resin Film

The method according to the present invention for producing a biaxially stretched polyester resin film characteristically comprises:

(A) a step of obtaining a reaction product by subjecting a recycled polyester raw material to a depolymerization reaction (depolymerization step);

(B) a step of filtering this reaction product and recovering the filtrate (filtration step);

(C) a step of obtaining a polyester resin by subjecting the filtrate to a polycondensation reaction at a temperature of at least 260° C. in the presence of a polymerization catalyst and at a pressure of less than or equal to 1.0 hPa (polycondensation step); and (D) a step of producing an unstretched film using a starting material comprising said polyester resin and subjecting this unstretched film to biaxial stretching (stretching step).

(A) The Depolymerization Step

In the depolymerization step, a reaction product is obtained by subjecting a recycled polyester raw material to a depolymerization reaction.

In the present invention, recycled polyester raw material refers, for example, to post-use polyester products and to polyester scrap generated during the process of producing polyester products.

The post-use polyester products refer, for example, to polyester moldings (including fibers and films) that have been brought to market and recovered post-use. Typical examples here are packaging materials and containers such as PET bottles.

The polyester scrap generated during the process of producing polyester products (this polyester scrap is also referred to hereinafter as "unutilized polyester resin") is polyester that is not placed on the market, for example, out-of-spec resin pellets, material not required during molding (film edges), fragments severed during molding, waste (polyester waste) generated during, for example, molding or processing, cut materials of transition products produced during a product line change, and cut materials for trial products and defective products.

The shape or form of the recycled polyester raw material is not limited and may be the initial shape per se of the aforementioned post-use polyester products or unutilized polyester resins, and in addition can be, for example, shapes such as the cut fragments and pulverized product (powder) respectively yielded by the execution of a process such as cutting or pulverization, and also the shapes of solid articles, e.g., the moldings (e.g., pellets) provided by molding the preceding. Examples at a more specific level are a) the pellets yielded by cutting after the melt of a polyester waste has been cooled and b) the cut fragments yielded by the fine trimming of a polyester molding, such as a PET bottle. Another permissible form is the liquid (dispersion or solution) obtained by dispersing or dissolving, e.g., a cut fragment or pulverized material (powder) as described above, in a solvent. During the production of the film according to the present invention using these raw materials, as necessary melting at a temperature greater than or equal to the melting point and introduction into a kettle as the melt may also be carried out.

The recycled polyester raw material is subjected to a depolymerization reaction in the depolymerization step, and as a result, for example, oligomer constituting this raw material can be obtained.

Recycled polyester raw material alone can be subjected to the depolymerization reaction when the depolymerization reaction is performed; however, in the present invention, the recycled polyester raw material is desirably subjected to the depolymerization reaction in the presence of ethylene terephthalate oligomer and ethylene glycol. Depolymerization is performed using only recycled polyester raw material in conventional methods that utilize a recycled polyester raw material. In contrast, in the present invention, the depolymerization reaction of the recycled polyester raw material is conducted in the presence of ethylene terephthalate oligomer and ethylene glycol. The depolymerization reaction is desirably carried out with the introduction of recycled polyester raw material so as to provide a "total glycol component/total acid component" molar ratio in a prescribed range for all of the components of the ethylene terephthalate oligomer, ethylene glycol, and recycled polyester raw material. By doing this, the precipitation of not only various inorganic materials, but also foreign material deriving from non-polyester resins, proceeds efficiently, and as a consequence these foreign materials can be effectively removed in the filtration step as mentioned below. The diethylene glycol content and carboxyl end group concentration in the polycondensation step, described below, will also be in prescribed ranges, and a recycled polyester resin having a relatively small amount of foreign material can be obtained.

It is desirable in the production method according to the present invention that the aforementioned depolymerization reaction does not bring about decomposition of the recycled polyester raw material to the monomer, but rather brings about decomposition to oligomer having about 5 to 20 repeating units. By exercising this control, the precipitation of not only various inorganic materials, but also foreign material deriving from non-polyester resins, proceeds efficiently, and as a result even more of the foreign material can be removed.

As the ethylene terephthalate oligomer and ethylene glycol, a known material or a commercially available material can be used. They may also be prepared by a known production method. In particular, the esterification reaction product of, for example, ethylene glycol and terephthalic acid can be favorably used as the ethylene terephthalate oligomer. The number-average degree of polymerization of the ethylene terephthalate oligomer is not limited, but can be, for example, about 2 to 20.

The amount of use of the ethylene terephthalate oligomer and ethylene glycol is not limited, but, based on the preceding considerations, this is preferably established so as to provide 1.08 to 1.35 for the "total glycol component/total acid component" molar ratio for all of the components of the ethylene terephthalate oligomer, ethylene glycol, and recycled polyester raw material.

The amount of use of the ethylene terephthalate oligomer is not particularly limited as long as the aforementioned molar ratio can established; however, it is preferably about 0.20 to 0.80 mass % in 100 mass % for the polyester resin yielded by the polycondensation step described below (this polyester resin is also referred to hereinafter as "recycled polyester resin"), with 0.30 to 0.70 mass % being more preferred. When the amount of ethylene terephthalate oligomer is less than the indicated amount, blocking within the recycled polyester raw material then readily occurs when the recycled polyester raw material is introduced, and the risk arises of an excessively large load being imposed on the stirrer. When, on the other hand, the amount of ethylene terephthalate oligomer is larger than the indicated range, particular problems are not caused in the depolymerization reaction, but the recycle ratio for the ultimately obtained recycled polyester resin may be decreased.

The amount of addition of the ethylene glycol is not particularly limited as long as the aforementioned molar ratio can be established; however, from the point of view of bringing about a satisfactory development of the depolymerization reaction, it is preferably 5 to 15 mass parts per 100 mass parts of the ethylene terephthalate oligomer, with 5 to 10 mass parts being more preferred. The recycled polyester resin has a low concentration of carboxyl end groups when the amount of ethylene glycol addition is too large and has a high carboxyl end group concentration when the amount of ethylene glycol addition is too small. In either case a departure from the range of the present application may occur. In particular, when 15 mass parts is exceeded, this facilitates solidification of the ethylene terephthalate oligomer in the reactor and it may not be possible to continue the reaction after this.

When ethylene terephthalate oligomer and ethylene glycol are used in the depolymerization reaction, there is no limitation on the method for mixing them (sequence of addition); however, in a particularly preferred method the recycled polyester raw material is added to a mixture that contains the ethylene terephthalate oligomer and ethylene glycol. Doing this can minimize unevenness in the progress of the depolymerization reaction.

With regard to the mixing of the ethylene terephthalate oligomer with the ethylene glycol, for example, preferably the ethylene glycol is added to the ethylene terephthalate oligomer. In addition, during this addition, for the purpose of preventing oligomer solidification, preferably the addition is carried out while establishing a uniform temperature for the contents by stirring with a stirrer.

The recycled polyester raw material is preferably introduced to this mixture while stirring at normal pressure, and introduction is more preferably carried out while purging with a small amount of an inert gas (nitrogen gas is ordinarily used). By doing this, the mixing of oxygen can be prevented and deterioration in the color can be more reliably prevented.

The total glycol component/total acid component molar ratio for the recycled polyester raw material is preferably 1.08 to 1.35 and in particular is more preferably 1.10 to 1.33 and most preferably 1.12 to 1.30. When the total glycol component/total acid component molar ratio is outside this range, the resulting recycled polyester resin will not satisfy the carboxyl end group concentration and/or diethylene glycol content required for the present invention, and the average pressure rise rate may also be high. That is, when the total glycol component/total acid component molar ratio during the execution of the depolymerization reaction is outside the indicated range, the various inorganic materials and the foreign material originating with non-polyester resin do not efficiently precipitate; these foreign materials cannot be effectively filtered during the filtration step; the foreign materials readily precipitate after the polycondensation step;

and as a result there is a risk of producing a recycled polyester resin that exhibits a high average pressure rise rate.

The reaction temperature during depolymerization (particularly the internal temperature of the reactor) in the depolymerization step is not limited, but in particular is preferably established in the range from 245° C. to 280° C. and is more preferably established in the range from 255° C. to 275° C. When the reaction temperature during depolymerization is less than 245° C., the reaction product will solidify and the operability will deteriorate, and, even if the recycled polyester resin can be obtained, it will tend to have an excessively high diethylene glycol content or carboxyl end group concentration. When this reaction temperature exceeds 280° C., there is a risk that the obtained recycled polyester resin will have an excessively high diethylene glycol content or carboxyl end group concentration.

In addition, the depolymerization reaction time (reaction time from after the completion of the introduction of the recycled polyester raw material) may be a time sufficient for the depolymerization reaction to finish and is not particularly limited; however, within 4 hours is generally preferred. In particular, it is more preferably within 2 hours especially from the standpoints of restraining the amount of secondary production of diethylene glycol and inhibiting deterioration in the color of the polyester. The lower limit on this reaction time is not limited and may be about 1 hour, for example.

The reaction apparatus is not particularly limited and a known or commercially available apparatus can be used. In particular, with regard to, for example, the capacity, stirring blade configuration, and so forth of the reactor, there are no particular problems with the esterification reactors in general use; however, in order to efficiently run the depolymerization reaction, a reactor is preferred that has a distillation column that does not discharge ethylene glycol from the system.

(B) The Filtration Step

In the filtration step, the aforementioned reaction product is filtered and the filtrate is recovered. The reaction product yielded by the aforementioned depolymerization step is a liquid that mainly contains the depolymerization product (in particular, recycled oligomer) of the recycled polyester raw material. In the filtration step, this reaction product (liquid) is passed across a filter and the foreign material is filtered off and the filtrate is recovered.

Since precipitation of both the various inorganic materials and the foreign material deriving from non-polyester resins is efficiently carried out in the aforementioned depolymerization step, a depolymerization product containing little foreign material can be obtained by passing the product across a filter (preferably a filter having a filtration particle size of about 10 to 25 μm) to filtrate the precipitated foreign material. When a filter is used that has a filtration particle size larger than 25 μm, the foreign material in the polymer cannot be adequately removed and there will be large amounts of foreign material in the resulting recycled polyester resin. As a consequence, when production of a stretched film is carried out using such a resin, contamination of the T-die surface (lip surface) may be produced and the film may rupture during stretching. When, on the other hand, a filter is used that has a filtration particle size of less than 10 μm, this is disadvantageous from a cost standpoint because clogging by foreign material is readily occurred and the filter life is shortened, and in addition there is a risk that the operability will also be reduced.

Ordinary filters can be used as filters usable in the filtration step, and metal filters are particularly preferred. There are no particular limitations on the material, which can be, for example, stainless steel. The type of filter is also not particularly limited and can be exemplified by screen changer filters, leaf disk filters, and candle-shaped sintered filters. A known or commercially available filter can be used for these.

(C) The Polycondensation Step

A polyester resin (recycled polyester resin) is obtained in the polycondensation step by subjecting the aforementioned filtrate to a polycondensation reaction in the presence of a polymerization catalyst at a temperature of at least 260° C. and a pressure less than or equal to 1.0 hPa.

There are no limitations on the polymerization catalyst, and, for example, at least one selected from germanium compounds, antimony compounds, titanium compounds, cobalt compounds, or the like can be used. Among these, the use of at least one selected from germanium compounds or antimony compounds is particularly preferred. The use of a germanium compound is preferred when the transparency of the resulting recycled polyester resin is considered to be particularly important. The individual compounds here can be exemplified by at least one selected from the oxides, inorganic acid salts, organic acid salts, halides, and sulfides of germanium, antimony, titanium, cobalt, or the like.

The amount of use of the polymerization catalyst is not particularly limited, but, for example, is preferably at least $5 \times 10^{-5}$ mol/unit and more preferably at least $6 \times 10^{-5}$ mol/unit, per 1 mol of the acid component of the produced polyester resin. The upper limit on this amount of use can be, for example, about $1 \times 10^{-3}$ mol/unit, but there is no limitation to this.

Since the polymerization catalyst contained in the recycled polyester raw material may in some instances also function as a catalyst in the polycondensation reaction, when polymerization catalyst is added in the polycondensation step, it is preferred that the type and content of polymerization catalyst contained in the recycled polyester raw material is considered.

In addition to the aforementioned polymerization catalyst, the following, for example, may also be added to the polycondensation reaction on an optional basis: a) a fatty acid ester capable of adjusting the melt viscosity, b) a hindered phenol-type antioxidant, c) a phosphorus compound capable of inhibiting the thermal decomposition of the resin, and so forth.

The fatty acid ester can be exemplified by beeswax (a mixture in which the main component is myricyl palmitate), stearyl stearate, behenyl behenate, stearyl behenate, glycerol monopalmitate, glycerol monostearate, glycerol distearate, glycerol tristearate, pentaerythritol monopalmitate, pentaerythritol monostearate, pentaerythritol distearate, pentaerythritol tristearate, pentaerythritol tetrastearate, and dipentaerythritol hexastearate. Preferred among the preceding are glycerol monostearate, pentaerythritol tetrastearate, and dipentaerythritol hexastearate. These can be used alone or two or more thereof can be used in combination.

For example, 2,6-di-t-butyl-4-methylphenol, n-octadecyl 3-(3',5'-di-t-butyl-4'-hydroxyphenyl)propionate, tetrakis[methylene-3-(3,5-di-t-butyl-4-hydroxyphenyl)propionate]methane, tris(3,5-di-t-butyl-4-hydroxybenzyl)isocyanurate, 4,4'-butylidenebis(3-methyl-6-t-butylphenol), triethylene glycol bis[3-(3-t-butyl-4-hydroxy-5-methylphenyl)propionate], and 3,9-bis{2-[3-(3-t-butyl-4-hydroxy-5-methylphenyl)propionyloxy]-1,1'-dimethylethyl}-2,4,8,10-tetraoxaspiro[5,5]undecane can be used as the hindered phenol-type antioxidant, with tetrakis[methylene-3-(3,5-di-t-butyl-4-hydroxyphenyl)propionate]methane being preferred from the standpoints of results and cost. A single selection or two or more selections from among the preceding can be used.

The phosphorus compound can be exemplified by phosphorous acid, phosphoric acid, trimethyl phosphite, triphenyl phosphite, tridecyl phosphite, trimethyl phosphate, tridecyl phosphate, triphenyl phosphate, and so forth. These can be used alone or two or more thereof can be used in combination.

The polycondensation reaction is conducted at a temperature of at least 260° C. and under a reduced pressure of less than or equal to 1.0 hPa. When the polycondensation reaction temperature is less than 260° C., or when the pressure during the polycondensation reaction exceeds 1.0 hPa, the polycondensation reaction time becomes long and as a consequence the productivity deteriorates and the carboxyl end group concentration in the recycled polyester resin will be too low.

The polycondensation reaction temperature is particularly preferably at least 270° C. When, on the other hand, the polycondensation reaction temperature is too high, the color deteriorates because the polymer is colored due to thermal decomposition, and the concentration of carboxyl end groups in the recycled polyester resin becomes too high also due to thermal decomposition. As a consequence, the upper limit on the polycondensation reaction temperature in the present invention is preferably generally not greater than 285° C.

The pressure is particularly preferably less than or equal to 0.8 hPa. The lower limit can be, for example, about 0.1 hPa, but there is no limitation to this.

Thus, recycled polyester resin can be obtained by running the polycondensation reaction operating as described in the preceding. The composition and properties of the obtained recycled polyester resin are not particularly limited, but are preferably established as described in the following.

The type of the recycled polyester resin is not limited in the present invention, but one in which polyethylene terephthalate (PET) is the main component is particularly preferred. The PET content in the recycled polyester resin is preferably at least 70 mass % and in particular is more preferably at least 80 mass % and most preferably 90 to 100 mass %.

Using 100 mol % for the total amount of the total glycol component, the diethylene glycol content in the recycled polyester resin according to the present invention is preferably about 0.5 to 4 mol % and in particular more preferably is 1 to 3.5 mol % and most preferably is 1.2 to 3 mol %. In particular, diethylene glycol can be produced as a by-product when ethylene glycol is used as a raw material for the recycled polyester resin yielded by the production method according to the present invention. The recycled polyester resin according to the present invention has a low content of this by-produced diethylene glycol, and, by setting the diethylene glycol content of not more than 4 mol %, capabilities having an even better heat stability can be obtained. Due to this, contamination of the T-die surface (lip surface) can be inhibited and a high productivity can be obtained during production of the unstretched sheet or stretched film.

The recycled polyester resin has a concentration of carboxyl end groups of preferably not more than 40 eq/t and in particular more preferably of not more than 30 eq/t, still more preferably not more than 25 eq/t, and most preferably not more than 20 eq/t. Having the carboxyl end group concentration be not more than 40 eq/t makes it possible to have capabilities that exhibit an excellent heat resistance and makes it possible to obtain highly heat-resistant moldings using a variety of molding methods. The lower limit for the carboxyl end group concentration is preferably greater than or equal to 10 eq/t from the standpoint of improving the mechanical strength, e.g., the tensile elongation, during forming film.

The recycled polyester resin has an average pressure rising rate, as measured by the method described below, of not more than 0.6 MPa/h and in particular of preferably not more than 0.5 MPa/h and more preferably not more than 0.4 MPa/h. The average pressure rising rate in the present invention is an index of the amount of foreign material derived from the various inorganic materials and foreign material derived from non-polyester resin, and a smaller average pressure rise rate indicates a lower amount of foreign material admixture. By setting the average pressure rising rate of not more than 0.6 MPa/h, it is possible to also produce high-ratio stretched film, for example, having a stretching ratio of at least 10 times. The lower limit for the average pressure rising rate can be about 0.01 MPa/h for example, but there is no limitation to this.

In the method for measuring the average pressure rising rate, a pressure rise tester having an extruder and pressure sensors can be used. The aforementioned filter is set at the front end of the extruder and the polyester resin is melted at 300° C. by the extruder. Using the value of the pressure applied to the filter when the melt is extruded from the filter at an ejection rate of 29.0 g/minute, the "initial pressure value (MPa)" is taken to be the pressure value at the start of extrusion, and the "final pressure value (MPa)" is taken to be the pressure value at the subsequent point in time at which extrusion has been carried out continuously for 12 hours. The average pressure rise rate is calculated using the following formula A based on these pressure values.

$$\text{average pressure rise rate (MPa/h)} = (\text{final pressure value} - \text{initial pressure value})/12) \quad \text{A}$$

The extruder, filter, or the like used in the measurement are not limited as long as the stipulations of the present invention are satisfied, and known or commercially available materials can be used as appropriate.

The intrinsic viscosity of the recycled polyester resin is not particularly limited, but generally about 0.44 to 0.80 is preferred and 0.55 to 0.70 in particular is more preferred. In addition, the degree of polymerization of the recycled polyester resin may also be raised using a solid-phase polymerization step. In this case, the intrinsic viscosity of the resulting recycled polyester resin is generally preferably 0.80 to 1.25.

The lower limit for the crystallization temperature (Tc) during cooling of the recycled polyester resin is preferably greater than or equal to 160° C., more preferably greater than or equal to 163° C., still more preferably greater than or equal to 165° C., and most preferably greater than or equal to 170° C.

In addition, the upper limit for Tc is preferably less than or equal to 180° C., more preferably less than or equal to 178° C., and most preferably less than or equal to 175° C. By incorporating recycled polyester resin having the crystallization temperature during cooling has been controlled into the indicated range, the resulting biaxially stretched polyester resin film will then exhibit a high tensile elongation and also an excellent flexural resistance in low-temperature environments.

(D) The Stretching Step

In the stretching step, a starting material containing the aforementioned polyester resin (recycled polyester resin) is used to produce an unstretched film, following by biaxial stretching of this unstretched film.

The content of the recycled polyester raw material in the starting material is not limited, but generally may be about at least 20 mass % (particularly about at least 24 mass %), and, viewed from an environmental standpoint, e.g., Eco mark certification and so forth, is preferably at least 25 mass %, more preferably at least 35 mass %, still more preferably at least 40 mass %, and in particular most preferably at least 50 mass %. When this content is too low, the recycle ratio associated with this is then reduced. The upper limit for this content can generally be set at about 80 mass %, but there is no limitation to this.

The recycled polyester resin may comprise only a single kind of recycled polyester resin, or may be a mixture of two or more kinds of recycled polyester resins, or may be a mixture of recycled polyester resin with resin other than recycled polyester resin. In order to bring the cooling crystallization temperature of the film according to the present invention into the stipulated range, the content of the recycled polyester resin generally is preferably at least 30 mass % and more preferably is at least 40 mass %. The upper limit can be, for example, not more than 95 mass % or not more than 98 mass % and in particular can be 100 mass %, but there is no limitation to this.

The resin other than recycled polyester resin can be exemplified by unutilized polyester resin and polyester resin that does not employ a recycled raw material (also referred to hereafter as "virgin polyester resin").

The starting material may also contain unutilized polyester resin, post-use polyester products, and so forth in order to raise the recycle ratio, in a range that does not substantially adversely affect the advantages of the present invention.

Unutilized polyester resin is material that is not placed in the market. It can be exemplified by unstretched scrap produced during the aforementioned film production, edge trimming scraps, slitting scraps, defective products, and so forth. These can be added in the form of pulverized products (flakes, etc.), pellets produced by remelting the preceding, and so forth.

A post-use polyester product is a product that is intended to be discarded after use post-production. After a suitable washing step, it can be added in the form of a pulverizate thereof or in the form of pellets produced by remelting it.

The content of unutilized polyester resin in the starting material is generally preferably not more than 75 mass % and in particular is more preferably not more than 65 mass %, still more preferably not more than 50 mass %, particularly preferably not more than 40 mass %, and most preferably not more than 35 mass %. When the unutilized polyester resin content exceeds 75 mass %, the foreign material, or material produced by thermal deterioration, increases and there is a tendency for problems such as breakage during film production and so forth to occur. In addition, a declining trend appears for the mechanical properties of the film, such as the tensile elongation.

The concentration of, for example, various additives such as antioxidants in addition to lubricants such as silica in the film scrap or defective product used as the unutilized polyester resin varies with the product lines that provide the waste. Due to this, as the content of the unutilized polyester resin in the starting material increases, unevenness in the concentration of these additives will be occurred and a negative influence may be exercised on the haze, wetting tension of the film surface, printability, and so forth of the resulting film.

For this reason, when the intended polyester resin film is composed of a plurality of layers, the unutilized polyester resin content in the surface layer is preferably not more than 50 mass %, in particular more preferably not more than 40 mass %, and most preferably not more than 35 mass %. In a middle layer, on the other hand, even a large content of unutilized polyester resin will not exercise an effect on the surface properties of the film, e.g., the wetting tension, printing suitability, and so forth, and the unutilized polyester resin content may then be large from the standpoint of raising the recycle ratio. The content of unutilized polyester resin in a middle layer may be 100 mass %.

In addition, with regard to the starting material, a higher recycle ratio for the film according to the present invention is preferred. More specifically, the recycle ratio generally is preferably at least 25 mass % and more preferably is at least 35 mass % and in particular is even more preferably at least 40 mass %, particularly preferably at least 50 mass %, and most preferably at least 65%. The upper limit can be, for example, about 80 mass %, but there is no limitation to this. Accordingly, the composition of the starting material is desirably adjusted so as to provide a recycle ratio as described in the preceding. The recycle ratio R in the present invention is the weight proportion given by the following formula.

$$R \text{ (mass \%)} = A \times B + C$$

(wherein:
A represents the weight proportion (mass %) of the recycled polyester raw material in the recycled polyester resin.
B represents the weight proportion (mass %) of the recycled polyester resin in the film.
C represents the weight proportion (mass %) of the unutilized polyester resin in the film.)

There is no limitation on the method for producing the unstretched film, and molding may be carried out using known film production methods. For example, the unstretched film can be obtained by extruding a melt of the raw material as described above through a T-die and subsequently cooling with a casting roll. In this case, the actual temperature of the surface of this casting roll must be very accurately managed from the standpoint of providing a uniform crystallinity for the unstretched film.

The obtained unstretched film is then subjected to a biaxial stretch. Doing this can yield a film that exhibits an excellent tensile elongation in both the MD and TD directions. The biaxial stretching method is not limited and can be, for example, a simultaneous biaxial stretching method or a sequential biaxial stretching method. A simultaneous biaxial stretching method is preferred from the standpoint of the planar balance of the mechanical properties, i.e., achieving a small difference between the MD and TD directions for both properties of tensile strength and tensile elastic modulus, while a sequential biaxial stretching method is preferred from the standpoint of improving the puncture strength and impact strength and from the standpoint of the planar balance in the thermal properties, i.e., achieving a small difference between the MD and TD directions for the dry heat shrinkage. Selection between these can be made as appropriate depending on the film properties and application.

The stretching ratio may be selected as appropriate depending on, for example, the application of the film, the properties desired for the film, and so forth, and, for example, may be 2 times to 4 times for the MD direction and 2 times to 4 times for the TD direction, but there is no limitation to this. The stretching temperature is also not limited, and stretching may be carried out, for example, in the range from 40° C. to 220° C. In the particular case of sequential stretching, stretching in the MD direction is preferably carried out at 40° C. to 80° C. and stretching in the TD direction is preferably carried out at 80° C. to 150° C. In addition, in the case of simultaneous biaxial stretching, stretching is preferably carried out at 160° C. to 220° C.

In order to improve the dimensional stability and inhibit the hot water shrinkage rate, the resulting biaxially stretched film is preferably subjected as necessary to a brief heat treatment at a temperature of about 220° C. to 240° C.

Crystallization in the stretched film progresses due to the deformation and heat applied in the stretching step. However, through the use of recycled polyester resin having the crystallization characteristics as expressed by a cooling crystallization temperature in the range according to the present invention, a favorable control of the surface crystallinity of the film is facilitated and a stretched film can be obtained that exhibits excellent mechanical properties and in particular an excellent flexural resistance, which is influenced by the state of crystallization of the surface.

3. Uses of the Film According to the Present Invention

The configuration of the film according to the present invention may be that of a film composed of a single layer or a film composed of a plurality of layers formed by simultaneous melt extrusion or by lamination.

Examples here are a two kinds/two layer structure in which a biaxially stretched polyester resin film containing recycled polyester resin, is laminated with a biaxially stretched polyester resin film containing unutilized polyester resin, and a two kinds/three layer structure in which a biaxially stretched polyester resin film containing unutilized polyester resin is sandwiched by biaxially stretched polyester resin films that contain recycled polyester resin. In the case of a polyester resin film having a layer structure in which a middle layer is sandwiched, as in the two kinds/three layer structure, because the middle layer film does not constitute the surface of the film composed of a plurality of layers and has very little influence on the flexural resistance, strength, surface crystallinity, and so forth of the film as a whole, the middle layer film may have a large content of unutilized polyester resin.

The film according to the present invention can be used as such by itself, or it can be used as a laminated film together with other layers (sealant layers, printing layers, gas barrier layers, and so forth).

A prescribed bag may also be constructed using the film according to the present invention or laminated film thereof. The bag shape is also not limited, and, for example, various bags can be fabricated, for example, a double seam bag, triple seam bag, zipper-equipped triple seam bag, pillow bag, gusset bag, bottom gusset bag, and standing pouch. Thus, for example, a packaging bag can be fabricated by making a laminated film by laminating, using a known method such as dry lamination or extrusion lamination, the film according to the present invention with a sealant layer, e.g., of a polyolefin, and melt bonding between sealant layers.

When used as a packaging material (packaging bag, container, etc.), the contents thereof are also not limited, and this packaging material can be widely used most prominently for foods, but also for pharmaceuticals/medical devices, cosmetics, chemicals, miscellaneous goods, electronic parts, and so forth.

EXAMPLES

Examples of the present invention are specifically described below, but do not limit to the scope of the present invention.

1. Materials Used

The raw materials used in the following examples and comparative examples are as follows.

<Recycled Polyester Resin A-1>

A slurry of terephthalic acid (TPA) and ethylene glycol (EG) (TPA/EG molar ratio=1/1.6) was introduced into an esterification reactor and a reaction was carried out using conditions of a temperature of 250° C. and a pressure of 50 hPa to obtain an ethylene terephthalate oligomer (number-average degree of polymerization: 5) having an esterification reaction ratio of 95%.

45.0 mass parts of the ethylene terephthalate oligomer was introduced into an esterification reactor and 7.0 mass parts of ethylene glycol was introduced under stirring with a stirrer of the esterification reactor. Once the drop in the internal temperature of the esterification reactor (hereinafter, referred to as "ES kettle") stopped, 55.0 mass parts of recycled polyester raw material (pellets of polyester waste generated in a polyester resin production process) was quantitatively introduced over about 2 hours via a rotary valve. In this case, the total glycol component/total acid component molar ratio ("G/A" in the following) was 1.16. This was followed by carrying out a depolymerization reaction for 1 hour using 270° C. for the heat treatment conditions.

The resulting depolymerization product was then transported by pressure to a polycondensation reactor with a candle filter having a mesh opening of 20 μm set between the ES kettle and the polycondensation reactor (hereinafter, referred to as "PC kettle"), followed by the addition as polymerization catalysts of antimony trioxide at $1.0 \times 10^{-4}$ mol/unit and an EG slurry of titanium dioxide at 0.20 mass %. The PC kettle was depressurized, and then after 60 minutes, a melt polymerization reaction was conducted for 4 hours at a temperature of 275° C. and a final pressure of 0.5 hPa to yield a recycled polyester resin A-1 (intrinsic viscosity=0.64, concentration of carboxyl end groups=27 eq/t, crystallization temperature during cooling=170° C.)

<Recycled Polyester Resin A-2>

An ethylene terephthalate oligomer (number-average degree of polymerization: 5) having an esterification reaction ratio of 95% was obtained in the same manner as in A-1.

30.0 mass parts of the ethylene terephthalate oligomer was introduced into an ES kettle and 7.0 mass parts of ethylene glycol was added under stirring with a stirrer of the esterification reactor. Once the drop in the internal temperature of the ES kettle stopped, 70.0 mass parts of recycled polyester raw material (same as in Example 1) was quantitatively added over about 2 hours via a rotary valve. When this was done, the G/A was 1.10. This was followed by carrying out a depolymerization reaction for 1 hour using 270° C. for the heat treatment conditions. The resulting depolymerization product was then transported by pressure to a PC kettle with a candle filter having a mesh opening of 20 μm set between the ES kettle and the PC kettle, followed by the addition as polymerization catalyst of antimony trioxide at $1.0 \times 10^{-4}$ mol/unit. The PC kettle was depressurized, and then after 60 minutes, a melt polymerization reaction was performed at a temperature of 275° C. for 5 hours and a final pressure of 0.5 hPa to obtain a recycled polyester resin A-2 (intrinsic viscosity=0.65, concentration of carboxyl end groups=38 eq/t, crystallization temperature during cooling=170° C.)

<Recycled Polyester Resin A-3>

An ethylene terephthalate oligomer (number-average degree of polymerization: 5) having an esterification reaction ratio of 95% was obtained in the same manner as in A-1.

45.0 mass parts of the ethylene terephthalate oligomer was introduced into an ES kettle, and 10.0 mass parts of ethylene glycol was added under stirring with a stirrer of the ES kettle. Once the drop in the internal temperature of the ES kettle stopped, 55.0 mass parts of recycled polyester raw material (pellets of polyester waste produced in a polyester resin production process) was quantitatively added over about 2 hours via a rotary valve so as to provide a total glycol component/total acid component molar ratio ("G/A" in the following) of 1.20, and a depolymerization reaction was performed at 270° C. for 1 hour as the heat treatment conditions. The obtained depolymerization product was then pressure-transported to a polycondensation reactor with a candle filter having a mesh opening of 20 μm set between the ES kettle and the polycondensation reactor (hereinafter, referred to as "PC kettle"), followed by the addition as polymerization catalysts of antimony trioxide at $1.0 \times 10^{-4}$ mol/unit and an EG slurry of titanium dioxide at 0.20 mass %. The PC kettle was depressurized, and then after 60 minutes, a melt polymerization reaction was carried out at a temperature of 260° C. and a final pressure after 60 minutes of 0.5 hPa for 7 hours to obtain a recycled polyester resin A-3 (intrinsic viscosity=0.64, concentration of carboxyl end groups=13 eq/t, crystallization temperature during cooling=170° C.)

<Recycled Polyester Resin A-4>

10 mass parts of ethylene glycol was added per unit time over 6 hours to 100 mass parts of a recycled polyester raw material in a rotary dryer, and mixed together. The treatment was performed at 220° C. in a nitrogen atmosphere. A solid-phase polymerization was also run for 10 hours at 0.5 mmHg and 230° C. to yield recycled polyester resin A-4 (intrinsic viscosity=0.65, concentration of carboxyl end groups=5 eq/t, crystallization temperature during cooling=144° C.)

<Recycled Polyester Resin A-5>

Recycled polyester resin A-5 (intrinsic viscosity=0.66, concentration of carboxyl end groups=9 eq/t, crystallization temperature during cooling=144° C.) was obtained in the same manner as in A-4, except that 5 mass parts of ethylene glycol was added per unit time with mixing over 6 hours to 100 mass parts of a recycled polyester raw material in a rotary dryer.

<Unutilized Polyester Resin>

The film scrap produced during the production of a polyethylene terephthalate resin film was pulverized and then remelted at 250° C. to 290° C. and pelletized. This was followed by drying to provide an unutilized polyester resin (crystallization temperature during cooling=179° C.) used for a polyester resin film.

<Virgin Polyester Resin B-1>

UT-CBR (cooling crystallization temperature=177° C.), a polyethylene terephthalate resin from Nippon Ester Co., Ltd., was used.

<Virgin Polyester Resin B-2>

An esterification product was obtained by conducting an esterification reaction between terephthalic acid and ethylene glycol in an esterification reactor. The resulting esterification product was transferred to a polycondensation reactor; after adding germanium dioxide as catalyst, a polycondensation was performed in the presence of the catalyst; and this was followed by forming into chips. The obtained polyester chips were additionally dried and crystallized at 170° C. for 2 hours in a nitrogen atmosphere. This was followed by solid-phase polymerization for 6 hours at 230° C. under a nitrogen current in a batch solid-phase polymerization apparatus.

The polyester yielded by solid-phase polymerization was subjected to a water treatment by immersion for 4 hours in hot water at 95° C., followed by dewatering and then drying under a nitrogen current for 2 hours at 120° C. to obtain a polyester resin (intrinsic viscosity=0.65, crystallization temperature during cooling=180° C.)

<Virgin Polyester Resin B-3>

KH2650A (crystallization temperature during cooling=155° C.) from Hengli Co., Ltd.

<Silica-Containing Polyester Resin (Silica Master)>

GS-BR-MG from Nippon Ester Co., Ltd. was used; this contained 1.5 mass % silica having an average particle diameter of 2.3 μm in a virgin polyethylene terephthalate resin.

Example 1

93.5 mass % of the recycled polyester resin A-1 and 6.5 mass % of the silica master were mixed and melt-kneaded in an extruder, followed by supply to a T-die and extrusion into sheet form and winding on a metal drum temperature-controlled to 20° C. for cooling and take up. Thus, an unstretched monolayer sheet having a thickness of approximately 120 μm was obtained. Then, while holding the edges of this unstretched sheet with grips in a tenter-type simultaneous biaxial stretching machine, a simultaneous biaxial stretch was performed under at a temperature of 180° C. and at a stretching ratio of 3.0 times in the MD direction and 3.3 times in the TD direction. This was followed by the execution of a heat treatment for 4 seconds at 215° C. using 5% for the relaxation ratio in the TD direction, slow cooling to room temperature, and the execution of a corona discharge treatment on one side. Thus, a biaxially stretched polyester resin film having a thickness of 12 μm was obtained. The recycle ratio for this film was 51.4%.

Example 2

A 12 μm-thick biaxially stretched polyester resin film was obtained in the same manner as in Example 1, except that the unutilized polyester resin was mixed and the contents of the recycled polyester resin A-1 and silica master were set as shown in Table 1. The recycle ratio for this film was 60.2%.

Example 3

Unstretched film obtained in the same manner as in Example 2 was subjected to stretching at a draw ratio of 3.5 times in the MD direction under a condition of 85° C. using a roll-type stretching machine, and then, while holding the edges with grips, and subjected to a sequential biaxial stretch at a stretching ratio of 3.6 times in the TD direction under a condition of 120° C. This was followed by the execution of a heat treatment for 3 seconds at a temperature of 230° C. and at a relaxation ratio of 2% in the TD direction, slow cooling to room temperature, and the execution of a corona discharge treatment on one side to obtain a biaxially stretched polyester resin film having a thickness of 12 μm. The recycle ratio for this film was 60.2%.

Example 4

A 12 μm-thick biaxially stretched polyester resin film was obtained using sequential biaxial stretching in the same manner as in Example 3, except that recycled polyester resin A-2 was used and the contents of the recycled polyester resin, unutilized polyester resin, and silica master were set as shown in Table 1 in each case. The recycle ratio for this film was 69.6%.

Example 5

A 12 μm-thick biaxially stretched polyester resin film was obtained using sequential biaxial stretching in the same manner as in Example 3, except that the recycled polyester resin A-3 was used and the contents of the recycled polyester resin, unutilized polyester resin, and silica master were set as shown in Table 1 in each case. The recycle ratio for this film was 60.2%.

Example 6

A biaxially stretched polyester resin film was obtained using sequential biaxial stretching in the same manner as in Example 4, except that the film thickness after stretching was 25 μm by adjusting the take-up speed from the T-die to the sheet, the temperature of the roll-type stretching machine was 83° C., and the TD direction relaxation was carried out at the temperature of at 228° C. for 6 seconds. The recycle ratio for this film was 69.6%.

Example 7

A 12 μm-thick biaxially stretched polyester resin film was obtained in the same manner as in Example 3, except that the contents of the recycled polyester resin A-1, unutilized polyester resin, virgin polyester resin B-1, and silica master were set as shown in Table 1 in each case. The recycle ratio for this film was 42.6%.

Example 8

A 12 μm-thick biaxially stretched polyester resin film was obtained by sequential biaxial stretching in the same manner as in Example 3, except that the recycled polyester resin to A-2 was used and the contents of the unutilized polyester resin, virgin polyester resin B-1, and silica master were set as shown in Table 1 in each case. The recycle ratio for this film was 43.3%.

Example 9

A 12 μm-thick biaxially stretched polyester resin film was obtained by sequential biaxial stretching in the same manner as in Example 3, except that the recycled polyester resin to A-3 was used and the contents of the unutilized polyester resin, virgin polyester resin B-1, and silica master were set as shown in Table 1 in each case. The recycle ratio for this film was 42.6%.

Comparative Example 1

A 12 μm-thick biaxially stretched polyester resin film was obtained by carrying out simultaneous biaxial stretching in the same manner as in Example 1, except that 46.7 mass % of virgin polyester resin B-1, 50.0 mass % of unutilized polyester resin, and 3.3 mass % of silica master were used for the composition of the polyester resin film. The recycle ratio for this film was 50.0%.

Comparative Example 2

A 12 μm-thick biaxially stretched polyester resin film was obtained by subjecting an unstretched film obtained in the same manner as in Comparative Example 1 to sequential biaxial stretching under the same conditions as in Example 3. The recycle ratio for this film was 50.0%.

Comparative Example 3

A 12 μm-thick biaxially stretched polyester resin film was obtained in the same manner as in Example 3, except that the recycled polyester resin A-4 was used and the contents of the virgin polyester resin B-1 and silica master were set as shown in Table 1. The recycle ratio for this film was 50.0%.

Comparative Example 4

A 12 μm-thick biaxially stretched polyester resin film was obtained in the same manner as in Example 7, except that the recycled polyester resin A-4 was used. The recycle ratio for this film was 62.8%.

Comparative Example 5

A 12 μm-thick biaxially stretched polyester resin film was obtained in the same manner as in Example 7, except that the recycled polyester resin A-5 was used. The recycle ratio for this film was 62.8%.

Comparative Example 6

A biaxially stretched polyester resin film was obtained using sequential biaxial stretching in the same manner as in Comparative Example 4, except that the film thickness after stretching was 25 μm by adjusting the take-up speed from the T-die to the sheet and the TD direction relaxation was performed at 213° C. for 8 seconds. The recycle ratio for this film was 62.8%.

Comparative Example 7

A 12 μm-thick biaxially stretched polyester resin film was obtained by carrying out simultaneous biaxial stretching in the same manner as in Example 1, except that 93.5 mass % of virgin polyester resin B-1 and 6.5 mass % of silica master were used for the composition of the polyester resin film. The recycle ratio for this film was 0.0%.

Comparative Example 8

A 12 μm-thick biaxially stretched polyester resin film was obtained by carrying out sequential biaxial stretching in the same manner as in Example 3, except that 76.7 mass % of virgin polyester resin B-1, 18.0 mass % of unutilized polyester resin, and 5.3 mass % of silica master were used for the composition of the polyester resin film. The recycle ratio for this film was 18.0%.

Comparative Example 9

A biaxially stretched polyester resin film was obtained using sequential biaxial stretching in the same manner as in Comparative Example 4, except that the film thickness after stretching was 60 μm by adjusting the take-up speed from the T-die to the sheet, the temperature of the roll-type stretching machine was 81° C., and the TD direction relaxation was performed at 228° C. for 10 seconds. The recycle ratio for this film was 50.0%.

Comparative Example 10

A 12 μm-thick biaxially stretched polyester resin film was obtained by subjecting an unstretched film obtained in the same manner as in Comparative Example 7 except that the virgin polyester resin B-2 was used, to a sequential biaxial stretching at the same stretching condition as in Example 3. The recycle ratio for this film was 0.0%.

Comparative Example 11

A 12 μm-thick biaxially stretched polyester resin film was obtained by subjecting an unstretched film obtained in the same manner as in Comparative Example 7 except that the virgin polyester resin B-3 was used, to a sequential biaxial stretching at the same stretching condition as in Example 3. The recycle ratio for this film was 0.0%.

Reference Example 1

A 15-μm biaxially stretched polyester resin film was obtained in the same manner as in Example 1, except that 91.5% of the virgin polyester resin B-1 and 6.5 mass % of the silica master and adding 3.5 mass % of "Modic GQ131" (polyester-type elastomer) from Mitsubishi Chemical Corporation as an impact resistance improver were used. The recycle ratio for this film was 0.0%.

Test Example 1

The following properties were evaluated on the films and so forth obtained in the examples and comparative examples as well as the reference example. The results are given in Tables 1 and 2. In each measurement, after the sample had been held for at least 2 hours in an environment having a temperature of 23° C. and a humidity of 50% RH, the sample was used for measurements. And, the measurements were performed in an environment having a temperature of 23° C. and a humidity of 50% RH.
(1) Intrinsic Viscosity
This measurement was carried out at a temperature of 20° C. using, as a solvent, a mixture of phenol and tetrachloroethane that these mass contents are equal each other.
(2) Concentration of Carboxyl End Groups
0.1 g of the obtained polyester resin film was dissolved in 10 mL of benzyl alcohol; 10 mL of chloroform was added to this solution; and the determination was then made by titration with a benzyl alcohol solution of 1/10 N potassium hydroxide.
(3) Composition of Polyester Resin
The obtained recycled polyester resin or polyester resin film was dissolved in a mixed solvent of deuterated hexafluoroisopropanol and deuterated chloroform (volume ratio=1: 20); the $^1$H-NMR was measured using a "Model LA-400 NMR" instrument from JEOL Ltd.; and the type and content of the copolymer components were determined from the integration intensities for the proton peaks for each component on the resulting chart.
(4) Tensile Strength (MPa)
The tensile strength was measured in accordance with Japanese Industrial Standard JIS K 7127 using an Autograph from the Shimadzu Corporation. The sample was provided by cutting out, in each of the MD direction and TD direction, a width of 10 mm and a length of 150 mm at the center portion of the TD direction of the polyester resin film obtained in the example, comparative example or reference example. The measurement was performed using conditions of a measurement length of 100 mm and a pulling rate of 500 mm/min, and the determination was made using the following formula.

tensile strength (MPa)=(tensile load (N) at breakage)/(original average cross-sectional area (mm$^2$) of the measurement sample)

(5) Tensile Elongation (%)
The tensile elongation was measured in accordance with Japanese Industrial Standard JIS K 7127 using an Autograph from the Shimadzu Corporation. The sample was provided by cutting out, in each of the MD direction and TD direction, a width of 10 mm and a length of 150 mm at the center portion of the TD direction of the polyester resin film obtained in the example, comparative example or reference example. The measurement was performed using conditions of a measurement length of 100 mm (distance between grips) and a pulling rate of 500 mm/min, and the determination was made using the following formula.

tensile elongation (%)=(grip displacement distance (mm) at breakage)/(original distance between grips (100 mm))×100

(6) Tensile Elastic Modulus (GPa)
The tensile elastic modulus was measured in accordance with Japanese Industrial Standard JIS K 7127 using an Autograph from the Shimadzu Corporation. The sample was provided by cutting out, in each of the MD direction and TD direction, a width of 10 mm and a length of 150 mm at the center portion of the TD direction of the polyester resin film obtained in the example, comparative example or reference example. The measurement was performed using conditions of a measurement length of 100 mm (distance between grips) and a pulling rate of 20 mm/min, and the determination was made using the following formula.

tensile elastic modulus (GPa)=$F/A \times \Delta L$ (1 mm)/$L$ (100 mm)×9.807×10$^{-3}$ F: stress at 1% elongation (kgf)
A: initial cross-sectional area of test specimen (mm$^2$)
ΔL: length of test specimen at 1% elongation (mm)
L: distance between grips (100 mm)
(7) Puncture Strength (N)
The polyester resin film obtained in the example, comparative example, or reference example was cut to 50 mm×50 mm centered on the center portion in the TD direction, and this was attached to a special fixing plate that had a 30 mm-diameter circular hole in the center. The puncture strength was measured using an Autograph from Shimadzu Corporation, a test speed condition of 50 mm/min using a semicircular-shaped needle having a diameter of 1.0 mm and a tip shape radius of 0.5 mm.
(8) Dry Heat Shrinkage (%)
A width of 10 mm and a length of 150 mm, in each of the MD direction and TD direction, was cut out at the center portion of the TD direction of the polyester resin film obtained in the example, comparative example or reference example; reference points were marked at a length of 100 mm; a treatment was performed for 15 minutes in a hot air current at 160° C.; the distance (mm) between the reference points post-treatment was read off; and the determination was made using the following formula.

hot water shrinkage (%)=(distance between reference points pre-treatment−distance between reference points post-treatment)/distance between reference points pre-treatment×100

(9) Haze (%)

The center portion in the TD direction of the polyester resin film obtained in the example, comparative example or reference example was measured based on Japanese Industrial Standard JIS K 7136 using a haze meter (NDH4000) from Nippon Denshoku Industries Co., Ltd.

(10) b* Value

The measurement was carried out by stacking 30 sheets of the polyester resin film obtained in the example, comparative example, or reference example. The measurement was performed based on Japanese Industrial Standard JIS K 7373 using an NF555 spectrophotometer from Nippon Denshoku Industries Co., Ltd. and using reflections conditions of a D65 light source and a viewing angle of 2°. A white plate having a tristimulus value X/Y/Z=84.3/89.0/93.5 was used as the cover plate. A positive value indicates a yellow hue and a negative value indicates a blue hue.

(11) Wet Tension (mN/m)

The measurement was carried out in accordance with Japanese Industrial Standard JIS K 6768 using Wetting Tension Test Mixtures No. 36.0 to 54.0 (FUJIFILM Wako Pure Chemical Corporation), and was performed on the corona-treated surface of the polyester resin film obtained in the example, comparative example or reference example. For the measured points, the wetting tension was measured at five points on a 200 mm interval toward the two edges from the center in the TD direction. This was measured every 1 m in the MD direction to give measurement at a total of 50 points. Table 2 reports the minimum and maximum values for the wetting tension values measured at the 50 points. A practical wetting tension is at least 44 mN/m, and the wetting tension is particularly preferably at least 46 mN/m.

(12) Ink Adherence (Suitability for Printing)

[Printing Step]

For the printing ink, NKFS102 diluent (Toyo Ink Co., Ltd.) was mixed with LIOALPHA R39 Indigo (Toyo Ink Co., Ltd.) to adjust the viscosity to 15 seconds using a Zahn Cup #3. The roll film for printing was prepared by slitting the polyester resin film obtained in the example, comparative example or reference example at positions 500 mm to the left and right from the center in the TD direction. Using a gradation chart plate engraved in the MD direction with gradations in the sequence 10%, 20%, 30%, 40%, and 100%, the ink was coated on the film, followed by drying at 50° C. for 10 seconds and roll up to produce the printed film.

[Evaluation Method]

Cellophane tape (18 mm wide) was attached, avoiding the entry of air bubbles, to the 40% gradation printed region of the resulting printed film from edge to edge in the TD direction, and the range 100 mm to the left and right from the center of the attached region was used as the evaluation region. This was rubbed lightly from above 20 times. The cellophane tape was then rapidly peeled off at a peeling angle of 180° with respect to the film; the peeling condition of the ink in the evaluation region was visually inspected; and a three-level evaluation was performed using the following criteria.

(Evaluation Criteria)

⊚: very good (no ink dot removal)

◯: good (minor ink dot removal)

X: poor (at least half of the ink dots are removed)

(13) Continuous Productivity

Evaluation was performed using the following criteria while the polyester film was being continuously produced.

⊚: Continuous production was carried out for at least 48 hours

◯: Continuous production was carried out for at least 24 hours, but it was in a situation where the film was not be able to produce due to a pressure rise at the filter, contamination of the lip surface of the T-die, film breakage, roll contamination, or the like. The continuous production time was less than 48 hours.

X: During continuous production within 24 hours, it was in a situation where the film was not be able to produce due to a pressure rise at the filter, contamination of the lip surface of the T-die, film breakage, roll contamination, or the like.

(14) Crystallization Temperature During Cooling of the Film (Recrystallization Temperature)

10 mg of the resin film obtained in the example, comparative example or reference example was weighed out and measured as the sample in accordance with Japanese Industrial Standard JIS K 7121 and using a differential scanning calorimeter (power compensation-type DSC8000) from PerkinElmer Inc. The measurement conditions were as follows: heating from 25° C. to 300° C. at a heating rate of 20° C./min, holding at 300° C. for 10 minutes, then cooling to 100° C. at a cooling rate of 40° C./min. The temperature of the peak top for crystallization during cooling was taken to be the cooling crystallization temperature Tc.

(15) Surface Crystallinity of the Film

Using an infrared spectrophotometer (FT/IR-6100) from JASCO Corporation, the surface crystallinity was determined based on the absorbance ratio ($1340 cm^{-1}/1410 cm^{-1}$) of the crystal absorption band in the vicinity of $1340 cm^{-1}$ and the correction band in the vicinity of $1410 cm^{-1}$ in the reflection method (ATR method).

The measurements for the present invention were carried out using an ATR610RS horizontal prism, a diamond prism, an angle of incidence of 45°, and cumulative number of 64 scans.

(16) Flexural Resistance in a Low-Temperature Environment

The obtained polyester resin film was held for 2 hours in an environmental test chamber adjusted to 5° C. and 65% RH and was then held for an additional 5 minutes in a −10° C. environment and was subjected to a 200-cycle flexural fatigue test (twisting angle=440°) in a −10° C. environment using a Gelbo Flex Tester (BE-1005, Tester Sangyo Co., Ltd.). The flexural resistance fatigue test was performed in accordance with the ASTM F 392 standard and the number of pinholes, i.e., the number of locations of ink penetration on filter paper, was measured on the film sample (chuck-to-chuck distance of 178 mm, diameter of 89 mm). The measurement was performed on 3 samples and the average value of the number of pinholes per 500 $cm^2$ was calculated.

TABLE 1

|  | recycled polyester resin raw material | | recycled polyester resin | | | composition of biaxially stretched polyester resin film |
|---|---|---|---|---|---|---|
|  | recycled polyester raw material mass parts | ethylene terephthalate oligomer mass parts | resin | G/A | intrinsic viscosity — | concentration of carboxyl end groups eq/t | recycled polyester resin content mass % |
| Ex. 1 | 55 | 45 | A-1 | 1.16 | 0.64 | 27 | 93.5 |
| Ex. 2 | 55 | 45 | A-1 | 1.16 | 0.64 | 27 | 76.7 |
| Ex. 3 | 55 | 45 | A-1 | 1.16 | 0.64 | 27 | 76.7 |
| Ex. 4 | 70 | 30 | A-2 | 1.10 | 0.65 | 38 | 82.3 |
| Ex. 5 | 55 | 45 | A-3 | 1.20 | 0.64 | 13 | 76.7 |
| Ex. 6 | 70 | 30 | A-2 | 1.10 | 0.65 | 38 | 82.3 |
| Ex. 7 | 55 | 45 | A-1 | 1.16 | 0.64 | 27 | 44.8 |
| Ex. 8 | 70 | 30 | A-2 | 1.10 | 0.65 | 38 | 44.8 |
| Ex. 9 | 55 | 45 | A-3 | 1.20 | 0.64 | 13 | 44.8 |
| Com. Ex. 1 | — | — | — | — | — | — | 0.0 |
| Com. Ex. 2 | — | — | — | — | — | — | 0.0 |
| Com. Ex. 3 | 100 | — | A-4 | — | 0.65 | 5 | 50.0 |
| Com. Ex. 4 | 100 | — | A-4 | — | 0.65 | 5 | 44.8 |
| Com. Ex. 5 | 100 | — | A-5 | — | 0.66 | 9 | 44.8 |
| Com. Ex. 6 | 100 | — | A-4 | — | 0.65 | 5 | 44.8 |
| Com. Ex. 7 | — | — | — | — | — | — | 0.0 |
| Com. Ex. 8 | — | — | — | — | — | — | 0.0 |
| Com. Ex. 9 | 100 | — | A-4 | — | 0.65 | 5 | 30.0 |
| Com. Ex. 10 | — | — | — | — | — | — | 0.0 |
| Com. Ex. 11 | — | — | — | — | — | — | 0.0 |
| Ref. Ex 1 | — | — | — | — | — | — | 0.0 |

| | composition of biaxially stretched polyester resin film | | | | | | |
|---|---|---|---|---|---|---|---|
|  | unutilized polyester resin content mass % | virgin polyester resin content mass % | impact resistance improver mass % | silica master content mass % | stretching method | recycle ratio % | concentration of carboxyl end groups eq/t |
| Ex. 1 | 0.0 | — | — | 6.5 | simultaneous | 51.4 | 41 |
| Ex. 2 | 18.0 | — | — | 5.3 | simultaneous | 60.2 | 39 |
| Ex. 3 | 18.0 | — | — | 5.3 | sequential | 60.2 | 38 |
| Ex. 4 | 12.0 | — | — | 5.7 | sequential | 69.6 | 40 |
| Ex. 5 | 18.0 | — | — | 5.3 | sequential | 60.2 | 23 |
| Ex. 6 | 12.0 | — | — | 5.7 | sequential | 69.6 | 55 |
| Ex. 7 | 18.0 | 31.9 | — | 5.3 | sequential | 42.6 | 40 |
| Ex. 8 | 12.0 | 37.5 | — | 5.7 | sequential | 43.3 | 42 |
| Ex. 9 | 18.0 | 31.9 | — | 5.3 | sequential | 42.6 | 25 |
| Com. Ex. 1 | 50.0 | 46.7 | — | 3.3 | simultaneous | 50.0 | 61 |
| Com. Ex. 2 | 50.0 | 46.7 | — | 3.3 | sequential | 50.0 | 62 |
| Com. Ex. 3 | 0.0 | 43.5 | — | 6.5 | sequential | 50.0 | 5 |
| Com. Ex. 4 | 18.0 | 31.9 | — | 5.3 | sequential | 62.8 | 6 |
| Com. Ex. 5 | 18.0 | 31.9 | — | 5.3 | sequential | 62.8 | 18 |
| Com. Ex. 6 | 18.0 | 31.9 | — | 5.3 | sequential | 62.8 | 6 |
| Com. Ex. 7 | 0.0 | 93.5 | — | 6.5 | simultaneous | 0.0 | 40 |
| Com. Ex. 8 | 18.0 | 76.7 | — | 5.3 | sequential | 18.0 | 41 |
| Com. Ex. 9 | 20.0 | 44.8 | — | 5.2 | simultaneous | 50.0 | 7 |
| Com. Ex. 10 | 0.0 | 93.5 | — | 6.5 | sequential | 0.0 | 40 |
| Com. Ex. 11 | 0.0 | 93.5 | — | 6.5 | sequential | 0.0 | 41 |
| Ref. Ex 1 | 0.0 | 90.0 | 3.5 | 6.5 | simultaneous | 0.0 | 41 |

TABLE 2

| | properties of biaxially stretched polyester resin film | | | | | | | | | |
|---|---|---|---|---|---|---|---|---|---|---|
| | | Tensile elongation | | Tensile strength | | Tensile elastic modulus | | Puncture | Flexural resistance | crystallization temperatures during Cooling |
| | thickness (μm) | MD (%) | TD | MD (Mpa) | TD | MD (Gpa) | TD | strength (N) | pinhole (number/m²) | Tc (° C.) |
| Ex. 1 | 12 | 121 | 150 | 258 | 230 | 3.9 | 3.7 | 8.1 | 7 | 173.0 |
| Ex. 2 | 12 | 134 | 143 | 261 | 232 | 3.9 | 3.6 | 7.8 | 9 | 174.1 |
| Ex. 3 | 12 | 143 | 115 | 210 | 255 | 4.0 | 4.7 | 7.9 | 3 | 174.3 |
| Ex. 4 | 12 | 143 | 115 | 208 | 251 | 4.1 | 4.7 | 8.0 | 4 | 172.5 |
| Ex. 5 | 12 | 111 | 116 | 221 | 242 | 4.0 | 4.5 | 7.6 | 4 | 172.5 |
| Ex. 6 | 25 | 152 | 113 | 200 | 244 | 3.8 | 4.2 | 14.0 | 5 | 171.2 |

TABLE 2-continued

| | | | | | | | | | | |
|---|---|---|---|---|---|---|---|---|---|---|
| Ex. 7 | 12 | 140 | 116 | 209 | 253 | 4.0 | 4.7 | 7.8 | 4 | 175.0 |
| Ex. 8 | 12 | 144 | 117 | 221 | 250 | 4.1 | 4.7 | 8.4 | 5 | 176.0 |
| Ex. 9 | 12 | 111 | 119 | 219 | 247 | 4.0 | 4.5 | 7.8 | 5 | 175.0 |
| Com. Ex. 1 | 12 | 93 | 108 | 227 | 290 | 4.2 | 3.6 | 6.0 | 17 | 178.1 |
| Com. Ex. 2 | 12 | 97 | 99 | 200 | 251 | 4.1 | 4.7 | 6.4 | 16 | 179.2 |
| Com. Ex. 3 | 12 | 85 | 93 | 270 | 244 | 4.0 | 3.7 | 6.3 | 11 | 144.1 |
| Com. Ex. 4 | 12 | 88 | 100 | 263 | 251 | 4.1 | 3.8 | 6.0 | 12 | 144.1 |
| Com. Ex. 5 | 12 | 90 | 97 | 254 | 241 | 4.0 | 3.8 | 6.4 | 11 | 146.5 |
| Com. Ex. 6 | 25 | 78 | 100 | 255 | 230 | 4.1 | 3.9 | 9.9 | 13 | 148.0 |
| Com. Ex. 7 | 12 | 119 | 123 | 234 | 235 | 3.5 | 3.6 | 7.7 | 15 | 178.6 |
| Com. Ex. 8 | 12 | 145 | 120 | 208 | 251 | 4.1 | 4.6 | 8.0 | 11 | 178.9 |
| Com. Ex. 9 | 60 | 107 | 100 | 189 | 218 | 3.4 | 4.2 | 20.6 | 13 | 148.6 |
| Com. Ex. 10 | 12 | 88 | 102 | 245 | 252 | 3.9 | 3.7 | 11.4 | 20 | 185.0 |
| Com. Ex. 11 | 12 | 105 | 100 | 250 | 250 | 3.8 | 3.7 | 8.0 | 15 | 158.0 |
| Ref. Ex. 1 | 12 | 105 | 111 | 230 | 225 | 3.6 | 3.6 | 19.6 | 8 | 168.0 |

| | properties of biaxially stretched polyester resin film | | | | | | | |
|---|---|---|---|---|---|---|---|---|
| | Surface crystallinity (—) | Dry heat shrinkage | | Hz (%) | b* | Wet tension (mN/m) | | Ink adherence | Continuous productivity |
| | | MD (%) | TD (%) | | | min | max | | |
| Ex. 1 | 1.34 | 1.5 | −0.4 | 6.5 | −2.0 | 52 | 58 | ◎ | ◎ |
| Ex. 2 | 1.35 | 1.5 | −0.3 | 7.6 | −2.1 | 52 | 58 | ◎ | ◎ |
| Ex. 3 | 1.24 | 1.1 | 0.9 | 7.4 | −2.1 | 48 | 52 | ○ | ◎ |
| Ex. 4 | 1.28 | 1.0 | 0.9 | 7.2 | −2.1 | 48 | 52 | ○ | ◎ |
| Ex. 5 | 1.31 | 1.1 | 0.9 | 7.6 | −2.1 | 48 | 52 | ○ | ○ |
| Ex. 6 | 1.33 | 1.0 | −0.2 | 5.0 | −1.8 | 48 | 52 | ○ | ○ |
| Ex. 7 | 1.25 | 1.0 | 1.0 | 7.6 | −2.1 | 48 | 52 | ○ | ◎ |
| Ex. 8 | 1.26 | 1.1 | 0.9 | 7.5 | −2.1 | 48 | 52 | ○ | ◎ |
| Ex. 9 | 1.29 | 1.0 | 0.9 | 7.6 | −2.1 | 48 | 52 | ○ | ○ |
| Com. Ex. 1 | 1.47 | 1.7 | −0.2 | 11.2 | 1.0 | 42 | 58 | X | X |
| Com. Ex. 2 | 1.52 | 1.0 | 0.9 | 11.9 | 1.2 | 44 | 56 | ○ | X |
| Com. Ex. 3 | 1.41 | 1.6 | −0.2 | 8.1 | 0.0 | 44 | 58 | ○ | X |
| Com. Ex. 4 | 1.44 | 1.6 | −0.3 | 8.4 | 0.7 | 44 | 58 | ○ | X |
| Com. Ex. 5 | 1.47 | 1.7 | −0.2 | 7.9 | 0.6 | 44 | 58 | ○ | X |
| Com. Ex. 6 | 1.44 | 1.4 | −0.3 | 8.0 | 0.7 | 44 | 58 | ○ | X |
| Com. Ex. 7 | 1.53 | 1.5 | −0.4 | 6.8 | −2.2 | 54 | 58 | ◎ | ◎ |
| Com. Ex. 8 | 1.51 | 1.1 | 0.9 | 7.2 | −2.1 | 50 | 54 | ◎ | ◎ |
| Com. Ex. 9 | 1.23 | 1.1 | 0.3 | 10.5 | 1.1 | 44 | 58 | ○ | ○ |
| Com. Ex. 10 | 1.52 | 1.1 | 1.1 | 6.0 | −1.8 | 52 | 56 | ○ | X |
| Com. Ex. 11 | 1.27 | 0.9 | 0.9 | 7.0 | −2.0 | 52 | 56 | ◎ | ○ |
| Ref. Ex. 1 | 1.05 | 1.4 | 1.0 | 18.0 | −1.0 | 36 | 48 | X | ○ |

In the biaxially stretched polyester resin films according to Examples 1 to 9, because all or part of the film raw material comprise polyester resin (recycled polyester resin) containing a component deriving from recycled polyester raw material and because the crystallization temperature during cooling satisfies the range required in the present invention, even if the films were thin film having a thickness of less than 50 μm, long-term continuous production was possible, the flexural resistance in a low-temperature environment of −10° C. was excellent, the tensile elongation in both the MD and TD directions was at least 100%, and the films had high recycle ratios of at least 35% for the recycle ratio in the film.

In Comparative Examples 1 and 2, on the other hand, while the recycle ratio in the film was high at 50%, recycled polyester resin is not contained and only unutilized polyester resin is included, and as a consequence breakage problems were occurred in the stretching step and the long-term continuous productivity was poor. The obtained biaxially stretched polyester resin films exhibited a poor flexural resistance in low-temperature environments and numerous pinholes were generated. Moreover, the tensile elongation was low, the haze was high, and the color was also yellow.

In Comparative Examples 3 to 6, because ethylene terephthalate oligomer is not contained in the raw material for the recycled polyester resin used, the crystallization temperature during cooling did not meet the range required in the present invention. In addition, the tensile elongation was low, breakage problems were occurred during the stretching step, and the long-term continuous productivity was poor; moreover, the resulting biaxially stretched polyester film had a poor flexural resistance in low-temperature environments with the production of numerous pinholes.

Comparative Example 9 had a greater film thickness than in Comparative Examples 3 to 6, and due to this its long-term continuous productivity and tensile elongation were improved. However, its crystallization temperature during cooling did not satisfy the range required in the present invention, and the low-temperature flexural resistance was poor and the haze was also high.

Comparative Examples 7, 8, 10, and 11 did not contain recycled polyester resin and as a result had a poor flexural resistance in low-temperature environments. In particular, because the crystallization temperature during cooling in Comparative Examples 10 and 11 did not satisfy the range required in the present invention, the flexural resistance in low-temperature environments was low and numerous pinholes were observed.

The invention claimed is:

1. A biaxially stretched polyester resin film characterized in that the film satisfies the following properties (1), (2), and (3):

(1) in differential scanning calorimetry (DSC), after heating the film from 25° C. to 300° C. at a heating rate of 20° C./minute and holding for 10 minutes at 300° C., the temperature of crystallization during cooling at a cooling rate of 40° C./minute is 160° C. to 180° C.;

(2) a number of pinholes after the execution of 200 repeating cycles of a flexural fatigue test in a −10° C. atmosphere using a Gelbo Flex Tester is not more than 10/500 cm$^2$; and (3) a concentration of carboxyl end groups is 20 to 60 eq/t.

2. The biaxially stretched polyester resin film according to claim 1, wherein a haze of the film is not more than 10.0%.

3. The biaxially stretched polyester resin film according to claim 1, wherein a surface crystallinity as determined by infrared spectroscopic analysis (ATR-IR) using a total reflection measurement method is 1.1 to 1.4.

4. The biaxially stretched polyester resin film according to claim 1, having a thickness of not more than 50 μm and having a tensile elongation in both the MD direction and TD direction of at least 100%.

5. The biaxially stretched polyester resin film according to claim 1, having a b* value of 0 or less.

* * * * *